June 27, 1967 M. HETZEL 3,328,657

ELECTRONIC WATCH

Filed April 26, 1966 2 Sheets-Sheet 1

INVENTOR.
Max Hetzel

INVENTOR
Max Hetzel

United States Patent Office
3,328,657
Patented June 27, 1967

3,328,657
ELECTRONIC WATCH

Max Hetzel, Bienne, Switzerland, assignor to Centre Electronique Horloger S.A., Neuchatel, Switzerland
Filed Apr. 26, 1966, Ser. No. 545,375
Claims priority, application Switzerland, Feb. 18, 1964, 1,967/64, 1,968/64
4 Claims. (Cl. 318—128)

This application is a continuation-in-part of my previous application Ser. No. 433,034 filed Feb. 16, 1965 now abandoned.

The present invention relates to the small electronic watches in which the driving member and the time-basis are constituted by one and the same resonator in deflection, the oscillation frequency of which can be adjusted by means of members mounted at the free extremities of said resonator.

The object of the present invention is to provide improvements to these devices intended to render the oscillation frequency adjustment easier.

According to a feature of the present invention, the means for changing the oscillation frequency are movable fingers, the centre of gravity of which is not coincident with their axis of rotation, said fingers moving along a scale which indicates the frequency changes in seconds per day.

According to another feature of the present invention, said fingers are mounted at right angles to the resonator oscillation plane.

According to still another feature of the present invention, said fingers are constituted by a small pointed metal tongue, squeezed under the head of a screw where it can still rotate about the shank of said screw.

The features of the present invention will be disclosed hereafter, reference being had to the accompanying drawing in which.

Figure 1:
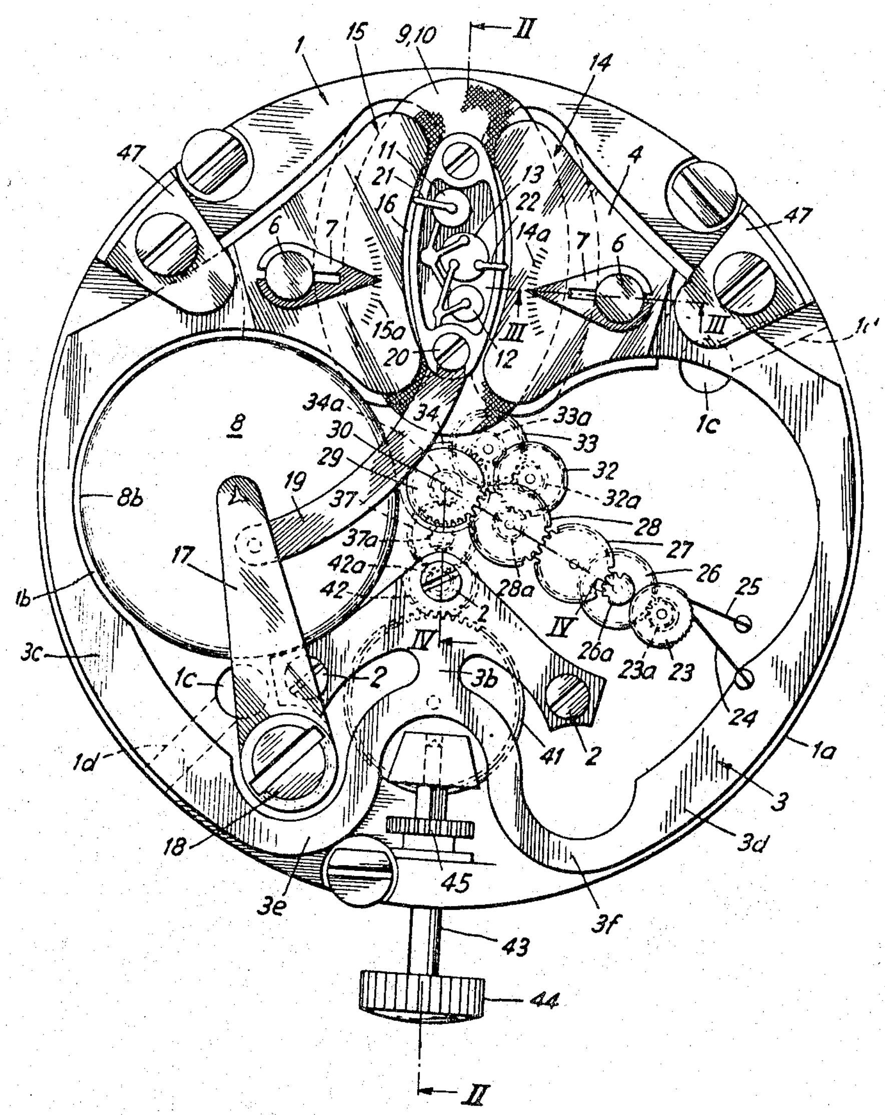
FIGURE 1 is a plan view of a clock-work movement according to the invention.
Figure 2:
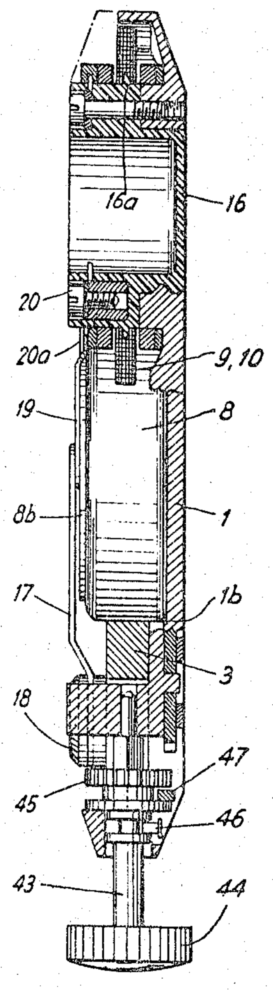
FIGURES 2 and 3 are cross-sections of FIGURE 1, along II—II and III—III respectively.

FIGURES 1 and 2 show a bottom-plate 1 to which is fixed, by means of three screws, the V-shaped foot *3a* of a vocal frequency resonator 3. The oscillation parts of that resonator have approximately the shape of a small omega ($\omega$) and they are connected to the foot *3a* by a link *3b*.

The invention further relates in particular to an electronic timepiece with a two-armed bending oscillator, both arms of the oscillator being provided with a permanent magnet for each, which both present an air gap with a magnetic field normal to the plane of oscillation of the oscillator through which are passed the windings of a driving and of a scanning coil extending parallel to the plane of oscillation. Now according to the invention, all elements forming the electric circuit with the exception of the battery are arranged within the two coils, preferably in a cylindrical plastic container or tube having for example an elliptical plan, while the coils are wound on this plastic body.

Thus the electrical part of these timepieces can be manufactured simply and in quantity production and can be assembled without difficulties with the mechanical part and, if necessary, separated therefrom again.

The oscillating parts are essentially constituted by two oscillating arms *3c* and *3d* which, through the major portion of their length, run along the periphery *1a* of the bottom plate 1 which is at the same time the periphery of the clockwork movement. As can be seen in FIGURE 2, there is provided between arms *3c*, *3d*, on the one hand, and bottom plate 1, on the other hand, a certain space, in order that the arms can oscillate freely.

At the extremity of each of the arms *3c* and *3d* is welded a magnetic head, respectively 14 and 15.

Figure 3:
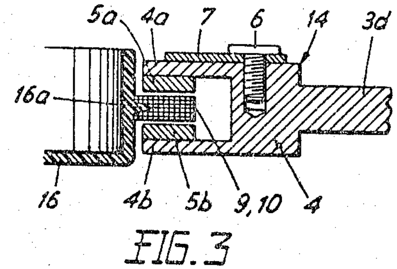

FIGURE 3 shows that the magnetic head 14, which is in mirror-symmetry with the magnetic head 15, is constituted by a soft iron part 4, the cross-section of which is in the shape of a U, and by polar pieces *5a* and *5b* fixed to the arms *4a* and *4b* of the U shaped iron 4, the shape of which corresponds to that of the coil. Whereas the resonator proper 3 is preferably made of a material with a low thermo-elasticity coefficient, such as for instance an alloy going by the name of "Elinvar," "Nivarox," "Ni-Spahn-C," or "Thermelast," one can use for part 4, instead of soft iron, a material such as "Permendur"; polar pieces *5a* and *5b* are made of a material with a high coercitive field, such as an alloy containing platinum and cobalt. The magnetic field in the air gap between polar pieces *5a* and *5b* is essentially homogeneous, and the lines of force are at right angles to the plane of the bottom-plate 1 and, therefore, to the plane in which is located the resonator 3 and in which its arms *3c* and *3d* oscillate.

On each of the magnetic heads 14 and 15 is placed, by means of a screw 6, a finger 7 which is friction-tight fitted, with its axis of rotation at right angles to the oscillation plane and its centre of gravity not coincident with its axis of rotation, so that when the finger is rotated, its centre of gravity and, therefore, the centre of gravity of the whole oscillating arm, is shifted and the natural frequency of that arm is modified.

These fingers are fixed to a flat head integral with the front face, easily accessible, of the resonator extremities, the width of said head in the oscillation plane being substantially greater than its thickness. Each of the magnetic heads 14 and 15 carries a scale, respectively *14a* and *15a*, on which can be read the frequency changes in seconds per day. Fingers 7 are preferably constituted by a small pointed metal tongue, squeezed under the head of the corresponding screw 6. In order to prevent the resonator from being damaged by shocks, an amplitude limitator 47 is fixed in the bottom plate 1 in the vicinity of each of the magnetic heads, with a view to restricting the oscillation amplitude of said magnetic heads in the direction opposite to the bottom-plate and towards the periphery of the latter.

Figure 5:
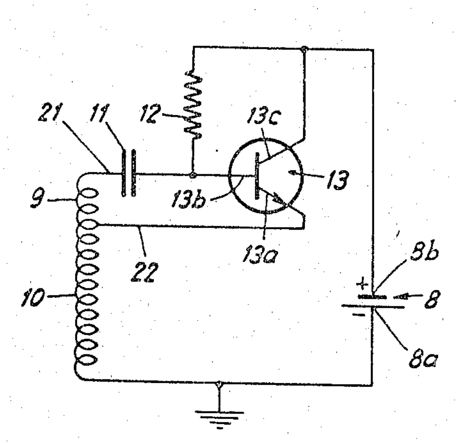
FIGURE 5 is the diagram of the diagram of the electric circuit of that watch.

FIGURE 5 is a diagram of the electric circuit for maintaining oscillations. This circuit comprises the pick-up coil 9, the energising coil 10, the capacitor 11, the resistor 12, the transistor 13 and the battery 8. The base-electrode *13b* of transistor 13 is connected through resistor 12 to the collector-electrode *13c*, on the one hand, and through capacitor 11 and pick-up coil 9 to the emitter-electrode *13a* on the other hand, said emitter-electrode being itself connected to collector electrode *13c* through energising coil 6 and battery 8. The electric connection between energising coil 10 and the negative pole *8a* of the battery is achieved through the bottom-plate 1 of the clockwork movement. It is clear that the pole of the battery which is connected to the bottom-plate is either the positive pole or the negative pole, according to the transistor used. Negative ground for NPN, positive for PNP.

As can be seen in FIGURES 2 and 3, the two coils 9 and 10 are flat elliptic coils, and they are removably mounted on a rib *16a* of a case 16 of plastic material. In said elliptic case are also mounted the capacitor 11, resistor 12 and transistor 13, whereas the two coils 9 and 10 are so dimensioned as to intersect all the lines of force of the magnetic field appearing in the air-gap of magnetic heads 14 and 15. Battery 8 rests by its negative pole 8 on bottom-plate 1; it is housed in a cylindrical recess 1*b* of bottom-plate 1, and kept in that position by a spring 17 fixed in turn by a screw 18 which is electrically insulated from bottom-plate 1. Between spring 17 and the cover of battery 8, which at the same time constitutes its positive pole 8*b*, there is gripped an electric conductor 19 which connects that positive pole to screw 20, screwed in metal socket 20*a* and connected to resistor 12, on the one hand, and to the collector-electrode 13*c* of transistor 13, on the other hand. In FIGURE 1 can be seen the conductor 21 which connects capacitor 11 to pick-up coil 9 and also the conductor 22 which connects the emitter-electrode 13*a* of transistor 13 to the junction point of coils 9 and 10.

That circuit operates as follows:

Whenever one of the arms of resonator 3 is shifted under the action of an accidental movement, a voltage is induced in pick-up coil 9, which results in the production of a current in the pick-up coil 10, said current giving rise to a magnetic field which drives magnetic heads 14 and 15 in the direction of the original displacement. As soon as the amplitude defined by the resiliency of resonator 3 is reached, the arms oscillate in the opposite direction. After a few to-and-fro movements, the oscillation is stabilized and arms 3*c* and 3*d* oscillate at a constant frequency and with a constant amplitude, so that magnetic heads 14 and 15 periodically draw near to, and withdraw from, each other.

The adjustment of the desired frequency can be obtained in the course of manufacturing, by slightly stripping the oscillating arms at some place or other; the arc-shaped segments 3*e* and 3*f* of arms 3*c* and 3*d* can be made thinner, for instance by means of a drill.

Figure 4:
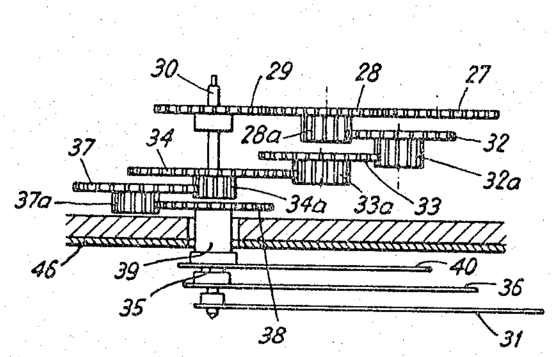
FIGURE 4 is a partial cross-section of FIGURE 1 along IV—IV.

The conversion of the movement of translation of the arms to a rotary movement is achieved by means of a pawl 24 fixed to one of the arms (in the present instance, arm 3*d*), said pawl driving a ratchet wheel 23. The teeth of said ratchet wheel are so dimensioned that wheel 23 rotates by one tooth for every oscillation of the resonator. The backward rotation of wheel 23 is impeded by a blocking pawl 25 fixed to bottom-plate 1. To the staff of ratchet wheel 23 is fixed a pinion 23*a* in mesh with a toothed wheel 26*a* which meshes in turn with wheel 27. None of the spindles of these wheels is shown in the figures, in order to render these wheels more visible. Wheel 27 drives, through the medium of a wheel 28, the seconds wheel 29, to the staff 30 of which is fixed the seconds-hand 31, as can be seen in FIGURE 4. Pinion 28*a* is integral with wheel 28, and meshes with a wheel 32, the pinion 32*a* of which meshes in turn with a wheel 33. Pinion 33*a* integral with that wheel 33 meshes with the minutes-wheel 34, fixed to a cannon-pinion 35 co-axial with the seconds staff 30 and carrying the minutes-hand 36, and also a pinion 34*a* driving an intermediate wheel 37, the pinion 37*a* of which meshes with the hour wheel 38. The latter is fixed to the cannon-pinion 39 carrying the hour hand 40. The movement of the oscillator 3 is thus transmitted to hands 31, 36 and 40. For correcting the position of the hands, there is provided a hand-setting stem 43 provided with a crown-button 44 outside the case and with a transmission-wheel (or crown-wheel) 45 within said case. That hand-setting stem is located substantially in the plane of resonator 3. The latter is symmetrical with respect to a plane perpendicular to the oscillation plane and passing through the hand-setting stem, and it comprises an indentation forming a free space between the periphery of the clockwork movement 1*a* and the resonator 3, said free space serving to house the hand-setting stem 43. Said stem can be axially shifted, so that when it is drawn out, the transmission-wheel 45 meshes with the hand-setting wheel 41 through the medium of lever 46 and rocking-bar 47. The hand-setting wheel 41 in turn meshes with wheel 42, the pinion 42*a* of which drives the intermediate wheel 37.

With such an arrangement of the clockwork movement, it is possible to fix a dial 46 provided with feet in the bottom plate 1 which is provided with holes 1*c* for the dial feet and inner threads 1*d* for the fixation screws.

As can be seen, the special shape of the resonator, the arms of which follow the periphery of the clockwork movement through the major portion of their length, leaves a large free space within which can be easily housed not only the gears necessary for driving the hands, but also other gears such as those which are necessary for driving a date-disc or other indicator devices. Again, a sufficient space provided for locating the battery, so that it is possible to use a circular battery having a fairly large diameter, which can be inserted between the resonator arms.

The very narrow elastic connecting neck 3*b* connects the resonator arms to a fixation foot 3*a*. This narrowness isolates the arms from the watch case, keeping a substantially greater part of the vibrating elastic energy in the arms than would be true with an ordinary tuning fork. This makes the oscillatory circuit as a whole more efficient thus reducing battery drain.

What is claimed is:

1. In an electronic watch, elements forming an electric current circuit, a battery connected to the circuit, a two-arm resonator serving both as time-basis and as driving member, said two arms being each provided with a permanent magnet, each permanent magnet having pole pieces defining an air gap therebetween, said gap having a plane of vibration, with a magnetic field perpendicular to the plane of vibration of said resonator, windings running parallel to the plane of vibration in said air gap, said windings interacting electromagnetically with said magnets the direction of the windings in the air gap being resolvable with a component at right angles to the direction of oscillation of the magnet, said windings being structurally in the shape of a closed loop, and having disposed inside the loop all the said elements forming the electric current circuit with the exception of said battery and said windings themselves.

2. An electronic watch as claimed in claim 1, wherein said resonator is an audio frequency resonator.

3. An electronic watch as claimed in claim 1, wherein said circuit elements are disposed in a plastic container of oval cross-section having at least one rib, said windings being removably mounted on said rib.

4. An electronic watch as claimed in claim 1 wherein the direction of the windings in said air gap are at right angles to a component at right angles to the direction of oscillation of the magnet.

No references cited.

RICHARD B. WILKINSON, *Primary Examiner.*

G. F. BAKER, *Assistant Examiner.*